(12) United States Patent
George et al.

(10) Patent No.: US 9,514,165 B2
(45) Date of Patent: Dec. 6, 2016

(54) METHOD AND SYSTEM FOR HANDLING LOCK STATE INFORMATION AT STORAGE SYSTEM NODES

(71) Applicant: NETAPP, INC., Sunnyvale, CA (US)

(72) Inventors: Ben George, Mars, PA (US); Warren Dukes, Jr., Sunnyvale, CA (US)

(73) Assignee: NETAPP, INC., Sunnyvale, CA (US)

( * ) Notice: Subject to any disclaimer, the term of this patent is extended or adjusted under 35 U.S.C. 154(b) by 392 days.

(21) Appl. No.: 14/163,054

(22) Filed: Jan. 24, 2014

(65) Prior Publication Data

US 2015/0213011 A1 Jul. 30, 2015

(51) Int. Cl.
*G06F 17/30* (2006.01)
*G06F 3/06* (2006.01)
*H04L 29/08* (2006.01)

(52) U.S. Cl.
CPC ........... *G06F 17/303* (2013.01); *G06F 3/0647* (2013.01); *G06F 17/30079* (2013.01); *H04L 67/1097* (2013.01)

(58) Field of Classification Search
CPC ............. G06F 3/0488; G06F 3/04883; G06F 3/04842; G06F 3/017; G06F 3/04817; G06F 3/0482
See application file for complete search history.

(56) References Cited

U.S. PATENT DOCUMENTS 7,730,258 B1 * 6/2010 Smith .................. G06F 3/0622
711/114

* cited by examiner

*Primary Examiner* — Truong Vo
(74) *Attorney, Agent, or Firm* — Cooper Legal Group, LLC

(57) ABSTRACT

Methods and systems for handling lock state information between a first storage system node and a second storage system node coupled via a network link are provided. The second storage system node stores lock state information at a storage device previously managed by the first storage system node and notifies the first storage system node of a storage device location where the lock state information is stored. The second storage system node then transfers ownership of the storage device to the first storage system node that copies the lock state information from the storage device location to a memory location managed by the first storage system node. The first storage system node uses the lock state information to reconstruct any locks for storage space presented to a client and then processes client requests for reading and writing information at the storage device.

17 Claims, 9 Drawing Sheets

| Config Table 510 |
|---|
| Cluster_quorum 512 |
| Version_# 514 |
| Max_limit 516 |
| Aggregate_access 518 |
| ... 520 |

FIG. 5B

METHOD AND SYSTEM FOR HANDLING LOCK STATE INFORMATION AT STORAGE SYSTEM NODES

TECHNICAL FIELD

The present disclosure relates to storage systems and more particularly, to handling lock state information at storage system nodes.

RELATED ART

A storage system typically comprises one or more storage devices where information may be stored and from where information may be retrieved, as desired. The storage system may be implemented in accordance with a variety of storage architectures including, but not limited to, a network-attached storage (NAS) environment, a storage area network (SAN) and a storage device assembly directly attached to a client or host computer.

The storage system typically includes a storage operating system that may implement a high-level module, such as a file system, to logically organize information stored at storage volumes as a hierarchical structure of data containers, such as files and logical units. For example, stored files may be implemented as set of data structures, i.e., storage device blocks, configured to store information, such as the actual data for the file.

The storage system may be configured to operate according to a client server model of information delivery to thereby allow many clients to access data containers stored on the system. In this model, the client may comprise an application, such as a database application, executing in a computer that communicates with the storage system. Each client may send input/output ("I/O") requests to read and write data.

A plurality of storage systems may be interconnected to service numerous client requests. The plurality of storage systems provide redundancy to clients, which means that if one storage system becomes unavailable, then another storage system takes over the storage space provided to the client. In such an environment, managing rights associated with I/O operations is a challenge. Rights may be managed by issuing locks to one or more client application (may also be referred to as "a client") on a data container stored at a storage device. The lock provides certain rights to the client to perform read and write operations with respect to the data container. Continuous efforts are being made to better manage locks and information related to locks in networked storage systems.

BRIEF DESCRIPTION OF THE DRAWINGS

The foregoing features and other features will now be described with reference to the drawings of the various aspects of the present disclosure. In the drawings, the same components have the same reference numerals. The illustrated aspects are intended to illustrate, but not to limit the present disclosure. The drawings include the following Figures:

FIG. 5B shows an example of a configuration table or data structure used according to one aspect of the present disclosure;

DETAILED DESCRIPTION

As preliminary note, the terms "component", "module", "system," and the like as used herein are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

In one aspect, methods and systems for handling lock state information between a first storage system node and a second storage system node coupled via a network link are provided. The storage system nodes operate as partner nodes such that if one node fails, then another node can be used to process client requests.

The second storage system node stores lock state information at a storage device previously managed by the first storage system node and notifies the first storage system node of a storage device location where the lock state information is stored. The second storage system node then transfers ownership of the storage device to the first storage system node that copies the lock state information from the storage device location to a memory location managed by the first storage system node. The first storage system node can use the lock state information to reconstruct any locks for storage space presented to a client and then process client requests for reading and writing information at the storage device.

To facilitate an understanding of the various aspects of the present disclosure, the general architecture and operation of a networked, clustered storage system will now be described.

Figure 1:
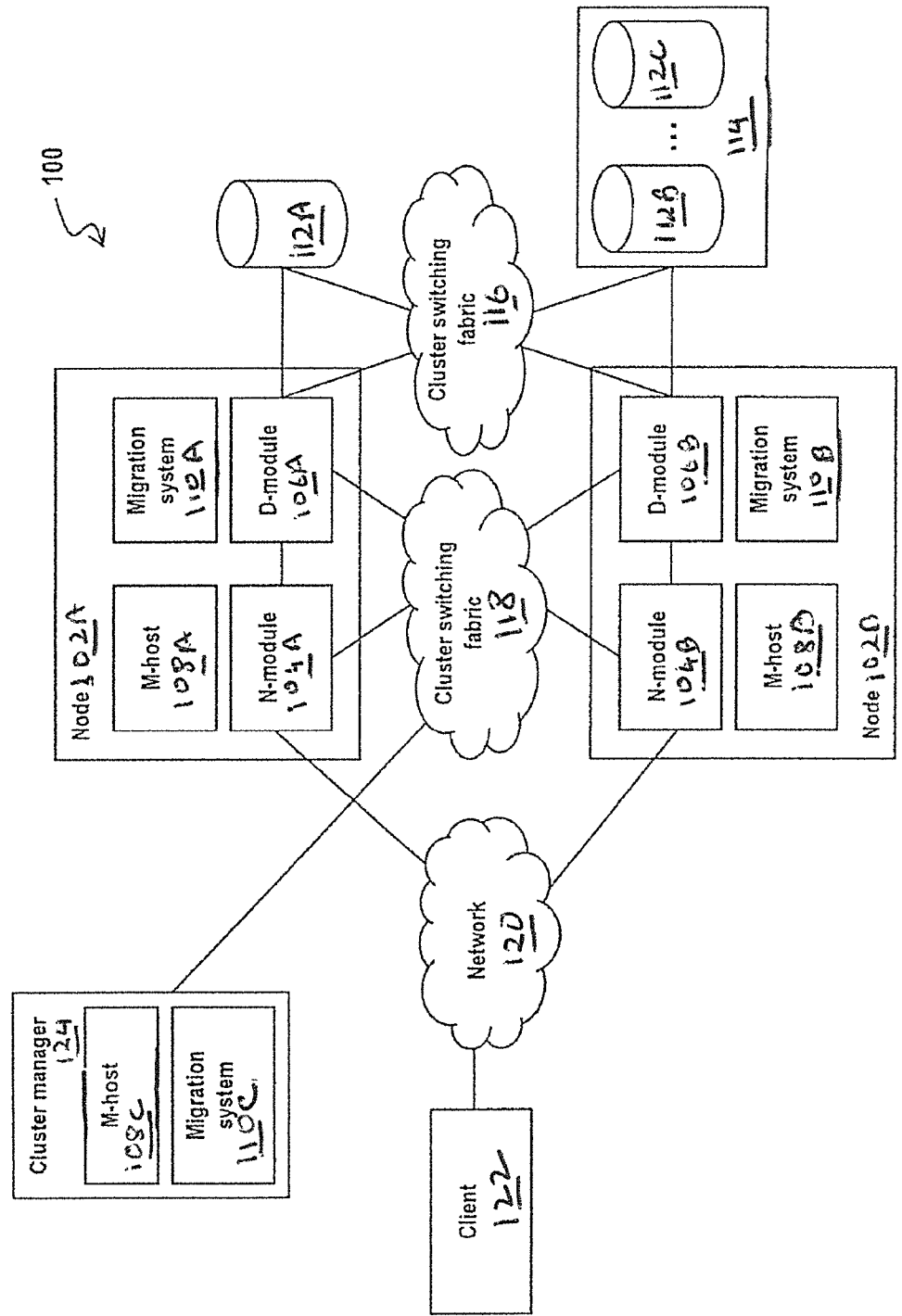
FIG. 1 shows a block diagram of a clustered system using the methodology of the present disclosure.

Clustered Storage System 100:

FIG. 1 shows an illustrative distributed storage system 100, also referred to as a "cluster", in which the present disclosure can advantageously be implemented in one aspect. Storage system nodes (may be referred to as "nodes") 102 (or nodes 102A, 102B) each implement a storage server and may be interconnected by a cluster switching fabric 118, which may be embodied as a switch (for example, a Gigabit Ethernet switch) or any other connection type.

Nodes 102 access storage device 112A and/or a storage subsystem 114 that include mass storage devices 112B-112C to provide data storage services to one or more clients 122 through a network 120. Storage devices 112A-112C may be referred to as storage device 112 or storage devices 112.

The mass storage devices 112 may include, for example, disks, flash memory, solid state memory devices, optical disks, tape drives, or other similar media adapted to store information. Storage devices 112 may be organized into an array 114 implementing a Redundant Array of Inexpensive Disks (RAID) scheme, whereby nodes 102 access storage devices 112 using one or more RAID protocols known in the art.

Network 120 may be, for example, a local area network (LAN), wide area network (WAN), metropolitan area network (MAN), global area network such as the Internet, a Fibre Channel fabric, an InfiniBand fabric or any combination of such interconnects. Client 122 may be, for example, a conventional personal computer (PC), server-class computer, workstation, handheld computing or communication device, or other special or general purpose computer.

Nodes 102 can each provide file-level service such as used in a network-attached storage (NAS) environment, block-level service such as used in a storage area network (SAN) environment, a service providing both file-level and block-level access, or any another service capable of providing other object-level access. Illustratively, each node 102 includes various functional components that operate to provide a distributed architecture of a storage server in cluster 100. To that end, each node 102 is generally organized as a set of modules including a network element (N-module 104A, 104B), a data element (D-module 106A, 106B), and a management element (M-host 108A, 108B), for carrying out storage server operations.

Illustratively, N-module 104 (N-module 104A, 104B) includes functionality to enable node 102 to connect to client 122 via network 120. D-module 106 (D-module 106A, 106B) connects to one or more storage devices 112 directly across an interconnect for example, via a cluster switching fabric 116, which may be a Fibre Channel interconnect, for servicing client requests targeted for storage devices 112.

Data storage at storage devices 112 is managed by nodes 102 which receive and respond to various read and write requests (may be referred to as input/output (I/O) requests) from client 122. In one aspect, a storage operating system operative in D-module 106 logically organizes storage at storage devices 112 as storage objects such as files, directories, volumes and aggregates. Each aggregate is identified by a unique identifier and a location. Within each aggregate, one or more flexible storage volumes are created whose size can be varied. A qtree, sub-volume unit may also be created within the storage volumes for storing data.

Client requests received by node 102 (e.g., via N-module 104A or 104B) may include a unique identifier such as an object ID to indicate a particular storage object on which to carry out the request. Preferably, only one of the D-modules owns each of the storage objects at storage devices 112. For instance, a storage object may be stored at storage devices 112A, and may be controlled by D-module 106A. A storage request targeted for the storage object may then be received by either N-module 104A or N-module 104B and forwarded to D-Module 106A via cluster switching fabric 118 for servicing.

Also operative in node 102 is an M-host (M-host 108A, 108B) which provides cluster services for node 102 by managing a data structure such as a replicated database, RDB (shown in FIG. 2), containing cluster-wide configuration information used by node 102. The various instances of the RDB in each of the nodes may be updated periodically by the M-host to bring the RDB into synchronization with each other. Synchronization may be facilitated by the M-host updating the RDB for node 102 and providing the updated information to the M-hosts of other nodes (e.g., across cluster switching fabric 118) in the cluster. In one aspect, the replicated database (RDB) stores storage object information used by node 102 to determine which D-module 106 owns each of the storage objects.

It should be noted that while FIG. 1 shows an equal number of N and D modules constituting a node in the illustrative system, there may be different number of such modules constituting a node in accordance with various aspects of the present disclosure. For example, there may be a number of N-modules and D-modules of node 102A that does not reflect a one-to-one correspondence between the N- and D-modules of node 102B. As such, the description of a node comprising only one N-module and D-module for each node 102 should be taken as illustrative only. In addition, certain other aspects of storage system 100 may include more than two nodes so the present disclosure is not so limited to the exemplary description provided with respect to FIG. 1.

In yet other aspects, nodes 102 may implement network subsystems which provide networked storage services for a specific application or purpose. Examples of such applications may include database applications, web applications, Enterprise Resource Planning (ERP) applications, etc., e.g., implemented in a client. Examples of such purposes may include file archiving, backup, mirroring, etc., provided, for example, on archive, backup, or secondary storage systems connected to a primary storage system. A network subsystem can also be implemented with a collection of networked resources provided across multiple nodes and/or storage subsystems.

System 100 includes a cluster manager 124 that performs cluster services for cluster 100 to coordinate activities between nodes 102. In one aspect, cluster manager 124 may be a conventional personal computer (PC), server-class computer, workstation, handheld computing or communication device, or other special or general purpose computer in some aspects. In other aspects, cluster manager 124 may be implemented as one or more functional components within other computing devices in cluster 100 and may, for instance, be implemented within any of nodes 102 for coordinating cluster services provided by the nodes.

Cluster services may include presenting a distributed storage system image (e.g., distributed file system image) for the cluster and managing the configuration of the nodes, for instance. To that end, a data structure such a volume location database, VLDB, may be managed by cluster manager 124 for centralized storage of information related to storage objects in the cluster and the D-modules owning respective storage objects. Management element M-host 108C operative in cluster manager 124 may then communicate with the M-hosts of the nodes (e.g., M-host 108A, 108B) to ensure that information stored in the various instances of the RDBs are synchronized with information in the VLDB.

Illustratively, cluster 100 implements a novel migration system 110 (shown as 110C) for migrating (or re-locating) an aggregate between nodes 102. The term migration as used herein means an aggregate that is re-located to another node. Advantageously, aggregates may be migrated between nodes 102 to distribute processing load among nodes 102 or to otherwise change ownership of an aggregate from a source storage system node (e.g., node 102A) to a destination storage system node (e.g., node 102B). Portions of migration system 110 (110A, 110B) may also be implemented at nodes 102 and cluster manager 124 for carrying out operations at each of the respective devices in accordance with certain aspects of the present disclosure.

In operation, migration system 110 may receive a migration request at cluster manager 124 which involves migrating an aggregate at storage devices 112A owned by D-module 106A of node 102A to node 102B or vice-versa. The request may then be forwarded to node 102A (or 102B) across cluster switching fabric 118 where it is received by D-module 106A via cluster switching fabric 118.

Upon receipt, D-module 106A may communicate with D-module 106B to verify that D-module 106B is configured to service the aggregate. Based on the verification, D-module 106A offlines the aggregate to halt servicing of the aggregate and updates the ownership information of the aggregate. Upon updating, the aggregate may be brought online by D-module 106B to resume service to the aggregate at D-module 106B. D-module 106B further sends the updated aggregate configuration to cluster manager 124, which synchronizes the updated aggregate configuration with the RDBs in each of nodes 102. A request targeted for the aggregate may then be received by either of N-modules 104 and forwarded to D-module 106B based on the synchronized RDBs.

Figure 2:
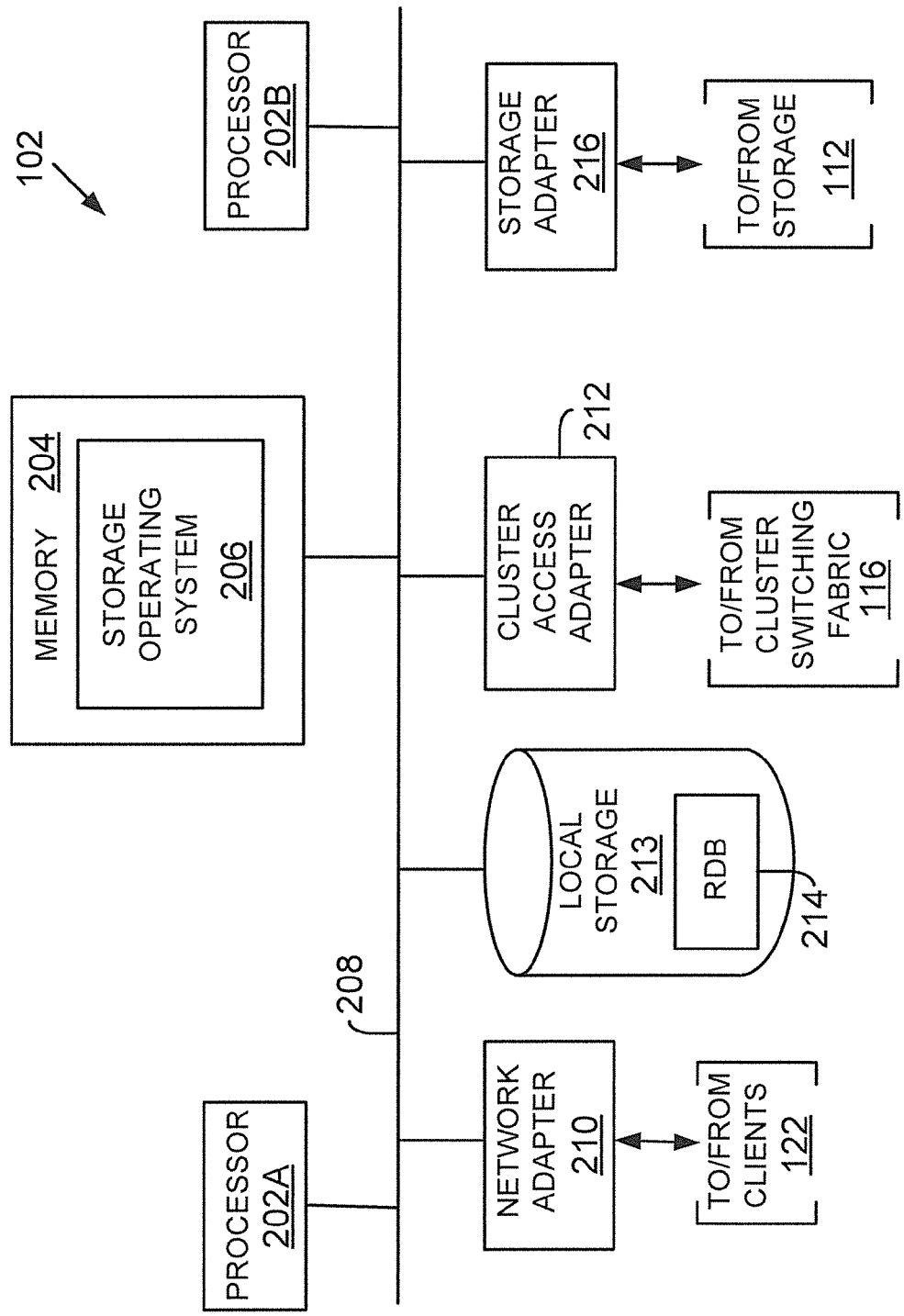
FIG. 2 shows an example of a node used by the system of FIG. 1.

Storage System Node:

FIG. 2 is a block diagram of a node 102 that is illustratively embodied as a storage system comprising of a plurality of processors 202A-202B, a memory 204, a network adapter 210, a cluster access adapter 212, a storage adapter 216 and local storage 213 interconnected by an interconnect system (referred to as bus) 208. The local storage 213 comprises one or more storage devices, such as disks, non-volatile storage devices, flash drives, video tape, optical, DVD, magnetic tape, bubble memory, electronic random access memory, micro-electro mechanical and any other similar media adapted to store information. The local storage 213 may be utilized by the node to locally store configuration information (e.g. for example, RDB 214).

Processors 202A/202B may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware based devices. The bus system 208 may include, for example, a system bus, a Peripheral Component Interconnect (PCI) bus, a Hyper-Transport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

The cluster access adapter 212 comprises a plurality of ports adapted to couple node 102 to other nodes of cluster 100. In the illustrative aspect, Ethernet may be used as the clustering protocol and interconnect media, although it will be apparent to those skilled in the art that other types of protocols and interconnects may be utilized within the cluster architecture described herein. In alternate aspects where the N-modules and D-modules are implemented on separate storage systems or computers, the cluster access adapter 212 is utilized by the N/D-module for communicating with other N/D-modules in the cluster 100.

The network adapter 210 comprises a plurality of ports adapted to couple the node 102 to one or more clients 122 over point-to-point links, wide area networks, virtual private networks implemented over a public network (Internet) or a shared local area network. The network adapter 210 thus may comprise the mechanical, electrical and signaling circuitry needed to connect the node to the network.

The storage adapter 216 cooperates with a storage operating system 206 executing on the node 102 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored at the storage devices 112. The storage adapter 216 comprises a plurality of ports having input/output (I/O) interface circuitry that couples to the storage devices over an I/O interconnect arrangement, such as a conventional high-performance, FC link topology.

It is noteworthy that although various adapters (210, 212 and 216) have been shown as separate components, the aspects disclosed herein are not limited to separate components. The aspects disclosed herein may be implemented using a converged network adapter (CNA) that is capable of handling both network and storage protocols, for example, a Fibre Channel over Ethernet (FCoE) adapter.

Each node 102 is illustratively embodied as a multiple processor system executing the storage operating system 206 that preferably implements a high-level module, such as a file system, to logically organize the information as a hierarchical structure of named directories, files and special types of files called virtual disks (hereinafter generally "blocks") at storage devices 112. However, it will be apparent to those of ordinary skill in the art that the node 102 may alternatively comprise a single or more than two processor systems. Illustratively, one processor 202A executes the functions of the N-module 104 on the node, while the other processor 202B executes the functions of the D-module 106.

The memory 204 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various non-transitory computer readable media, may be used for storing and executing program instructions pertaining to the disclosure described herein.

A storage operating system 206, portions of which is typically resident in memory 204 and executed by the processing elements, functionally organizes the node 102 by, inter alia, invoking storage operations in support of the storage service implemented by the node and maintaining a lock data structure for managing various lock types that are issued to client applications. An example of storage operating system 206 is the DATA ONTAP® (Registered trademark of NetApp, Inc.) operating system available from NetApp, Inc. that implements a Write Anywhere File Layout (WAFL®) (Registered trademark of NetApp, Inc.)) file system. However, it is expressly contemplated that any appropriate storage operating system may be enhanced for use in accordance with the inventive principles described herein. As such, where the term "ONTAP" is employed, it should be taken broadly to refer to any storage operating system that is otherwise adaptable to the teachings disclosed herein.

Information storage at storage devices 112 is preferably implemented using one or more storage volumes that comprise a collection of physical storage devices 112 cooperating to define an overall logical arrangement of volume block number (vbn) space on the volume(s). Each logical volume is generally, although not necessarily, associated with its own file system. The storage devices 112 within a logical volume/file system are typically organized as one or more groups, wherein each group may be operated as RAID.

Storage operating system 206 maintains a plurality of lock types in responding to client 122 requests for reading a data container, writing a data container or modifying a data container. The following provides a brief description of the various lock types that may be used by storage operating system 206 for managing access to data containers stored at storage devices 112.

"Opportunistic Lock" (may also be referred to as "OpLock") means a lock that is placed by one or more client application (may also be referred to as "a client") on a data container residing at a storage volume. The OpLock information may be embedded in a data container attribute (for example, meta-data) for the data container. OpLock, based on client requests, coordinates data caching and coherency between clients and storage systems. Coherent data in this context means data that is the same across a network i.e. data stored by the storage system and locally by the clients is synchronized. OpLocks are defined by the CIFS protocol and there are different types of OpLocks, for example, Level 1, Level 2 and other types. The rights associated with an OpLock depend on the OpLock type.

A "Shared Lock" is typically granted to a client application by storage operating system 206. The shared lock allows more than one application to access a data container.

"Byte lock" is a lock type that limits access to a portion of a data container. A client may request to open a data container and request a lock for a byte range of the file.

"Persistent Open" is a feature that may be used for various locks issued by storage operating system 206. The persistent open feature provides an exclusive right to a data container. When a node 102 grants a persistent open lock to a data container, it also provides a reconnect key to the client. If the node becomes unavailable for any reason, the persistent open lock stays open for a duration "t" and within that duration, the client may use the reconnect key to obtain the lock and access to the data container.

To manage the various locks, storage operating system 206 includes a lock manager that maintains one or more lock data structures for managing the locks and lock state information (may also be referred to as lock metadata). Details regarding the lock manager and the lock data structures are provided below.

Figure 3A:
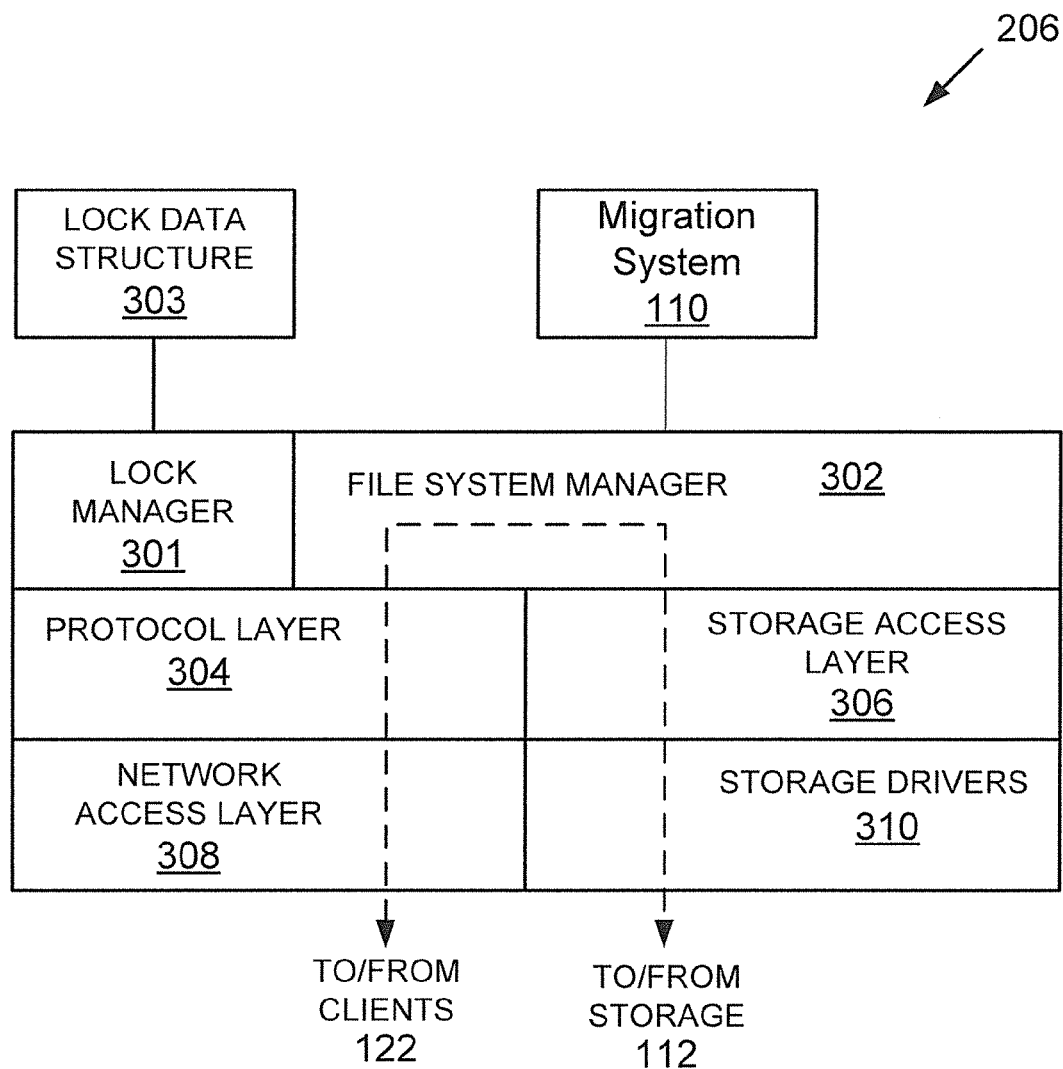
FIG. 3A shows an example of a storage operating system used according to one aspect of the present disclosure.

Storage Operating System:

FIG. 3A illustrates a generic example of storage operating system 206 executed by node 102, according to one aspect of the present disclosure. In one example, storage operating system 206 may include several modules, or "layers" executed by one or both of N-Module 104 and D-Module 106. These layers include a file system manager 302 that keeps track of a directory structure (hierarchy) of the data stored in storage devices 112 and manages read/write operations, i.e. executes read/write operations at storage devices in response to client 114 requests.

Storage operating system 206 may also include or interface with a lock manager 301 that maintains one or more lock data structures 303 for managing the various locks used for limiting access to data containers stored within cluster 100. Details of lock manager 301 and lock data structure 303 are provided below.

Storage operating system 206 interfaces with the migration system 110 for relocating aggregates, according to one aspect. Details regarding the relocation are provided below.

Storage operating system 206 may also include a protocol layer 304 and an associated network access layer 308, to allow node 102 to communicate over a network with other systems, such as clients 114. Protocol layer 304 may implement one or more of various higher-level network protocols, such as NFS, CIFS, Hypertext Transfer Protocol (HTTP), TCP/IP and others, as described below.

Network access layer 308 may include one or more drivers, which implement one or more lower-level protocols to communicate over the network, such as Ethernet. Interactions between clients 122 and mass storage devices 112 are illustrated schematically as a path, which illustrates the flow of data through storage operating system 206.

The storage operating system 206 may also include a storage access layer 306 and an associated storage driver layer 310 to allow D-module 106 to communicate with a storage device. The storage access layer 306 may implement a higher-level disk storage protocol, such as RAID, while the storage driver layer 310 may implement a lower-level storage device access protocol, such as FC (Fibre Channel) or SCSI.

The file system 302 is illustratively a message-based system that provides logical volume management capabilities for use in access to the information stored on the storage devices, such as disks. That is, in addition to providing file system semantics, the file system 302 provides functions normally associated with a volume manager. These functions include (i) aggregation of the storage devices, (ii) aggregation of storage bandwidth of the storage devices, and (iii) reliability guarantees, such as mirroring and/or parity (RAID).

The file system 302 illustratively may implement the write-anywhere file system having an on-disk format representation that is block-based using, e.g., 4 kilobyte (KB) blocks and using index nodes ("inodes") to identify data containers and data container attributes (such as creation time, access permissions, size and block location and lock information). The file system 302 uses data containers to store meta-data describing the layout of its file system; these meta-data data containers include, among others, an inode data container. A data container handle, i.e., an identifier that includes an inode number (inum), may be used to retrieve an inode from storage device.

Broadly stated, all inodes of the write-anywhere file system are organized into the inode data container. A file system (fs) info block specifies the layout of information in the file system and includes an inode of a data container that includes all other inodes of the file system. Each logical volume (file system) has an fsinfo block that is preferably stored at a fixed location within, e.g., a RAID group. The inode of the inode data container may directly reference (point to) data blocks of the inode data container or may reference indirect blocks of the inode data container that, in turn, reference data blocks of the inode data container. Within each data block of the inode data container are embedded inodes, each of which may reference indirect blocks that, in turn, reference data blocks of a data container.

Operationally, a request from the client 122 is forwarded as a packet over the computer network 120 and onto the node 102 where it is received at the network adapter 210. A network driver processes the packet and, if appropriate, passes it on to a network protocol and file access layer for additional processing prior to forwarding to the file system 302. Here, the file system generates operations to load (retrieve) the requested data from storage device 112 if it is not resident "in core", i.e., in memory 204.

If the information is not in memory, the file system 302 indexes into the inode data container using the inode number (inum) to access an appropriate entry and retrieve a logical vbn. The file system then passes a message structure including the logical vbn to a RAID system (part of or interfaces with layer 306); the logical vbn is mapped to a storage device identifier and storage device block number (storage device,dbn) and sent to an appropriate driver (e.g., a SCSI driver) of the storage device driver 310. The storage device driver 310 accesses the dbn from the specified storage device 112 and loads the requested data block(s) in memory for processing by the node. Upon completion of the request, the node (and operating system) returns a reply to the client 122.

It should be noted that the software "path" through the storage operating system layers described above needed to perform data storage access for a client request received at node 102 may alternatively be implemented in hardware. That is, in an alternate aspect of the disclosure, the storage access request data path may be implemented as logic circuitry embodied within a field programmable gate array (FPGA) or an ASIC. This type of hardware implementation increases the performance of the file service provided by node 102 in response to a file system request issued by client 122.

As used herein, the term "storage operating system" generally refers to the computer-executable code operable on a computer to perform a storage function that manages data access and may, in the case of a node 102, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the disclosure herein may apply to any type of special-purpose (e.g., file server, filer or storage serving appliance) or general-purpose computer, including a standalone computer or portion thereof, embodied as or including a storage system. Moreover, the teachings of this disclosure can be adapted to a variety of storage system architectures including, but not limited to, a network-attached storage environment, a storage area network and a disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present disclosure may be utilized with any suitable file system, including a write in place file system.

As mentioned above file system 302 includes the lock manager 301 that maintains locks for clients for providing access to data containers. The lock manager 301 maintains the lock data structure 303 that is used for recovering locks when a node that interfaces with a client system becomes unavailable and another node takes over the storage space managed by the node that became unavailable. The failover approach and the process for handling locks are now described below in detail.

Figure 3B:
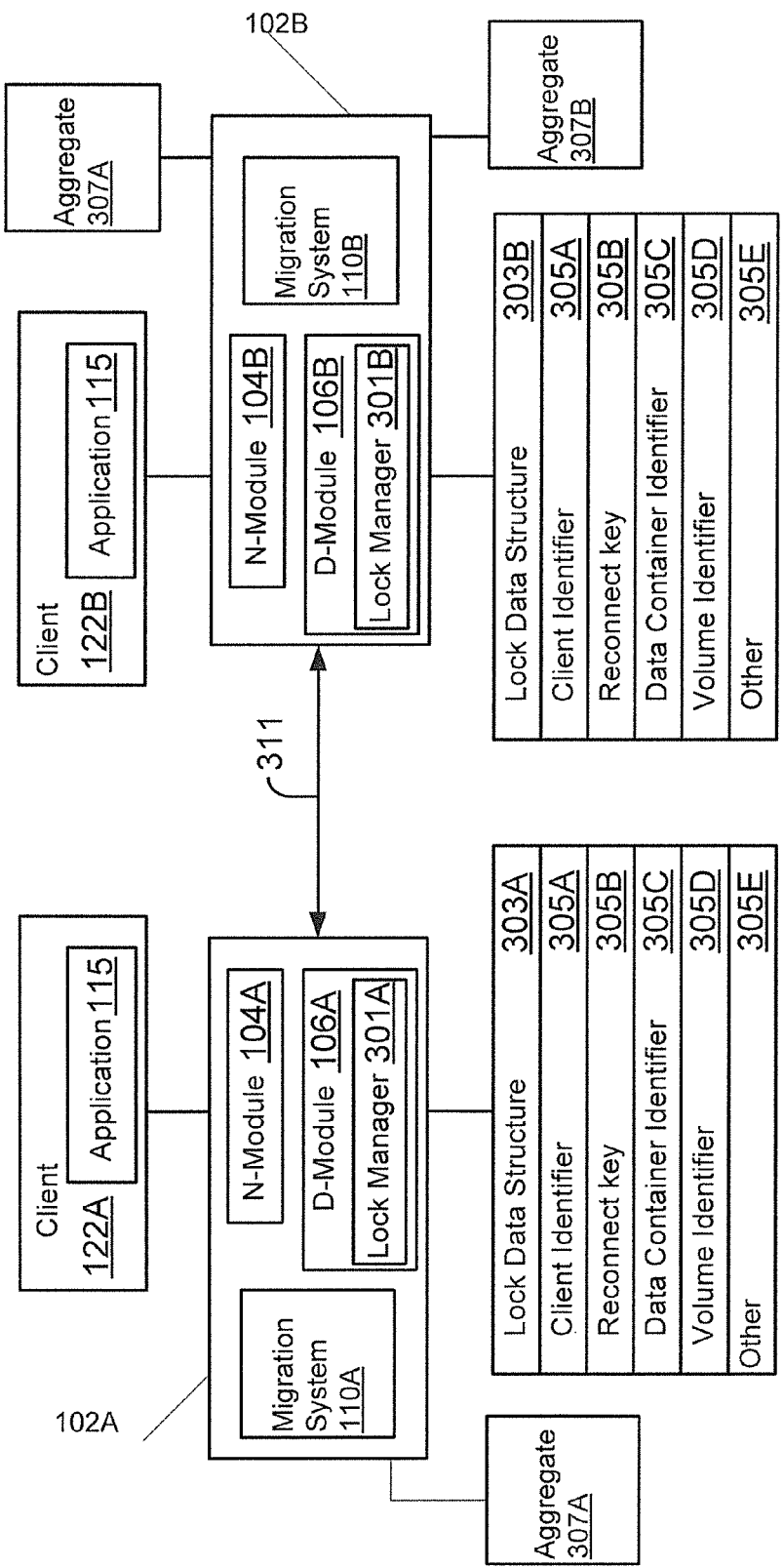
FIG. 3B shows an example of handling lock state information in a networked storage environment, according to one aspect of the present disclosure.

Aggregate Re-Location:

FIG. 3B shows two nodes 102A-102B that communicate with each other via link 311, according to one aspect. The link may go through fabric 118. Node 102A may provide storage access to client 122A and node 102B may provide access to client 122B. Application 115 may be executed by the clients for generating I/O requests. Application 115 may be a database application, an electronic mail program or any other processor executable application.

Node 102A manages aggregate 307A, while Node 102B manages aggregate B 307B. The lock manager 301A for node 102A maintains the lock data structure 303A, while the lock manager 301B for node 102B maintains lock data structure 303B.

Lock data structure 303A includes information for all the locks that are granted by node 102A and also includes lock state information for locks that are granted by node 102B to client 122B. Similarly, lock data structure 303B includes information for the locks granted by node 102B and also includes lock state information for locks that are granted by node 102A to client 122B.

As an example, lock data structure 303A may include various fields, 305A-305E that may be used to recover a lock and may be referred to as "lock state". A client identifier 305A identifies a client system that has been granted a lock. A reconnect key 305B is used by a client to recover a lock for a persistent open lock type. The data container for which the lock is granted is identified by 305C. The storage volume associated with the data container is identified by 305D. A reserved field 305E may be used for any other information.

Nodes 102A-102B may be referred to as partner nodes (or high availability nodes), which means that if for example, node 102A fails, then node 102B takes over aggregate 307A of node 102A to continue to provide access to client 114A and vice-versa. The process by which node 102B takes over the aggregate managed by node 102A may be referred to as "take over". When node 102A comes back on line and becomes available again, then node 102B relocates aggregate 307A back to node 102A such that node 102A may provide access to client 114A. This process is referred to as "give back". The takeover and give back process is part of an overall aggregate re-location (ARL) process that is managed by the migration system 110.

As part of ARL, during give back, when node 102B gives back ownership of aggregate 307A to node 102A, then the lock information maintained at lock data structure 303B also has to be moved to node 102A. In conventional systems, network link 311 is typically used to transfer the lock state information to node 102A. This approach has disadvantages because transferring the lock state information via a network link 311 can take a long time and consume computing resources.

The various aspects disclosed herein overcome this shortcoming by saving the lock state information for node 102A at aggregate 307A, after node 102B has taken over aggregate 307A. When the give back occurs, node 102A is notified by node 102B as to the location of where the lock state information is stored. Node 102A can then move the lock state information to a memory location from the physical storage device 112. Thus, one is able to avoid transferring the lock data structure via the network link 311.

Figure 4:
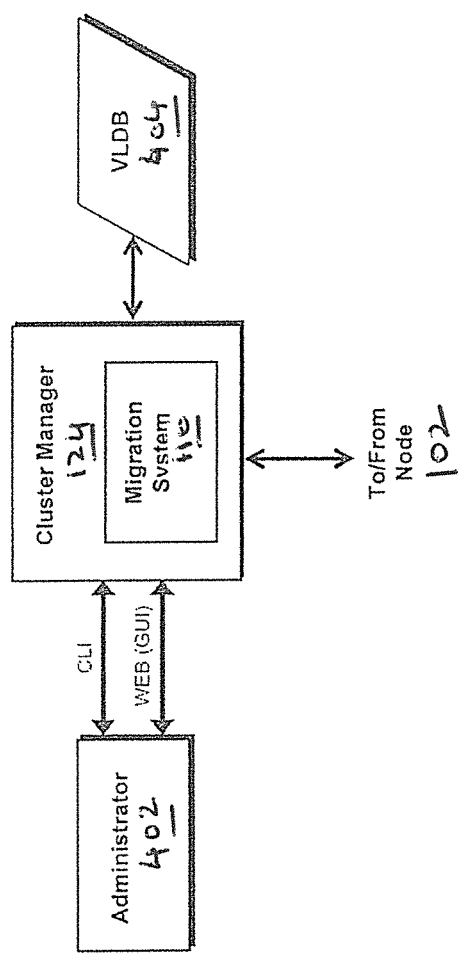
FIG. 4 shows an example of a cluster manager used according to one aspect of the present disclosure.

Cluster Manager:

FIG. 4 is a schematic block diagram illustrating a cluster manager 124 operative with the storage operating system 206 of a node 102 to manage cluster services for a cluster (e.g., cluster 100) including ARL. Preferably, the cluster manager 124 is implemented in a computing device connected, e.g., via cluster switching fabric 118, to the nodes (e.g., nodes 102) in the cluster. To that end, the cluster manager 124 may be implemented in a device including at least a processor, memory, and cluster access adapter for carrying out operations of the cluster manager. In other aspects, however, it will be appreciated that the functional components of cluster manager may be implemented or distributed across various other devices in the cluster such as within a node (e.g., node 102), so the disclosure is not so limited to the aspect discussed herein.

Illustratively, the cluster manager manages a data structure such as a volume location database (VLDB) 404 and synchronizes the various instances of the replicated databases, RDB (e.g., RDB 214) across the nodes. Configuration information of the nodes, such as the storage objects owned by each node, may be tracked in a centralized location at the cluster manager 124 using VLDB 404 to provide a distributed file system image to a client (e.g., client 122) to facilitate routing of client requests to nodes of the cluster. In the illustrative aspect, VLDB 404 maps a storage object identifier such as an aggregate ID to the D-module of the source storage system node which owns the aggregate. The aggregate ID may be generated by a storage abstraction layer (e.g., file system layer 302 from FIG. 3A) of a D-module constructing the aggregate.

In addition, VLDB 404 includes a plurality of entries, each constituting at least an aggregate ID and a D-module ID, which is accessed by the cluster manager 124 when synchronizing the RDBs across the nodes. In other aspects, VLDB 404 may include at least the aggregate ID and a node ID where each node includes only one D-module. In yet other aspects, an indicator other than a D-module ID or node ID may be included in an entry of VLDB 404 for uniquely identifying the D-module owning the aggregate.

Illustratively, indicators such as the D-module ID, node ID, or other unique identifier associated with the D-module may be generated by the storage operating system 206 of the node during initialization of the node or a component of the node. In this way, the cluster manager 124 may access VLDB 404 when routing aggregate migration requests to a source storage system node.

Although VLDB 404 is discussed herein in reference to volumes, it will be appreciated that other aspects of the illustrative data structure managed by the cluster manager for tracking the ownership of storage objects may involve tracking aggregates constituting one or more volumes or tracking other storage objects in accordance with teachings of the present disclosure.

Synchronization of RDBs, in one aspect, may be carried out by the cluster manager 124 receiving updates from a node undergoing a configuration change. For instance, a configuration change may involve a node no longer servicing an aggregate or a node newly servicing an aggregate upon a migration operation. The node may then provide the updated information to the cluster manager 124, which is stored in VLDB 404. Thereafter, the cluster manager 124 may provide the updated information to each of the RDBs of the nodes based on the information in VLDB 404. Alternatively, updates may be provided to the RDBs on a periodic basis (e.g., pre-determined time intervals) or in response to other events such as initialization of a new node. In this way, the RDB may be synchronized to reflect the current cluster configuration.

In one aspect, an administrator 402 of the cluster interfaces with the cluster manager 124 for requesting the migration of an aggregate to a destination storage system node (for example, from node 102B to node 102A (FIG. 3B). Administrator 402 may interface with the cluster manager 124 through command line interfaces or graphical user interfaces, for instance, to provide an aggregate ID and D-module ID to which the aggregate should be migrated. In other aspects, a migration request may be automatically generated by the cluster manager monitoring events in the cluster. For instance, an event may include a node achieving a network bandwidth threshold, a performance threshold, a storage threshold, or any other threshold for an operating characteristic of the node, and may be supplied by administrator 402 to the cluster manager. Network bandwidth may include the rate of data transfer through a given communication path, whereas performance threshold may include the amount of processing performed compared to the time and resources of the node used to carry out the processing. In contrast, storage threshold may include an available storage capacity or an amount of storage capacity already used by the node.

Administrator 402 may also provide additional migration information such as an aggregate ID and destination D-module ID (or node ID) for automatically performing the migration upon monitoring the event. It is noteworthy that the aspects disclosed herein are not limited to any specific reason for migrating an aggregate.

To that end, the cluster manager may carry out operations for monitoring the event by querying a node for information related to the event. One such operation may involve periodically requesting operating characteristic information from a node (e.g., via cluster switching fabric 150). Upon reaching the threshold for the operating characteristic, the cluster manager may automatically generate a request to migrate the indicated aggregate to the predetermined destination storage system node and provide the request to the appropriate source storage system node.

Figure 5A:
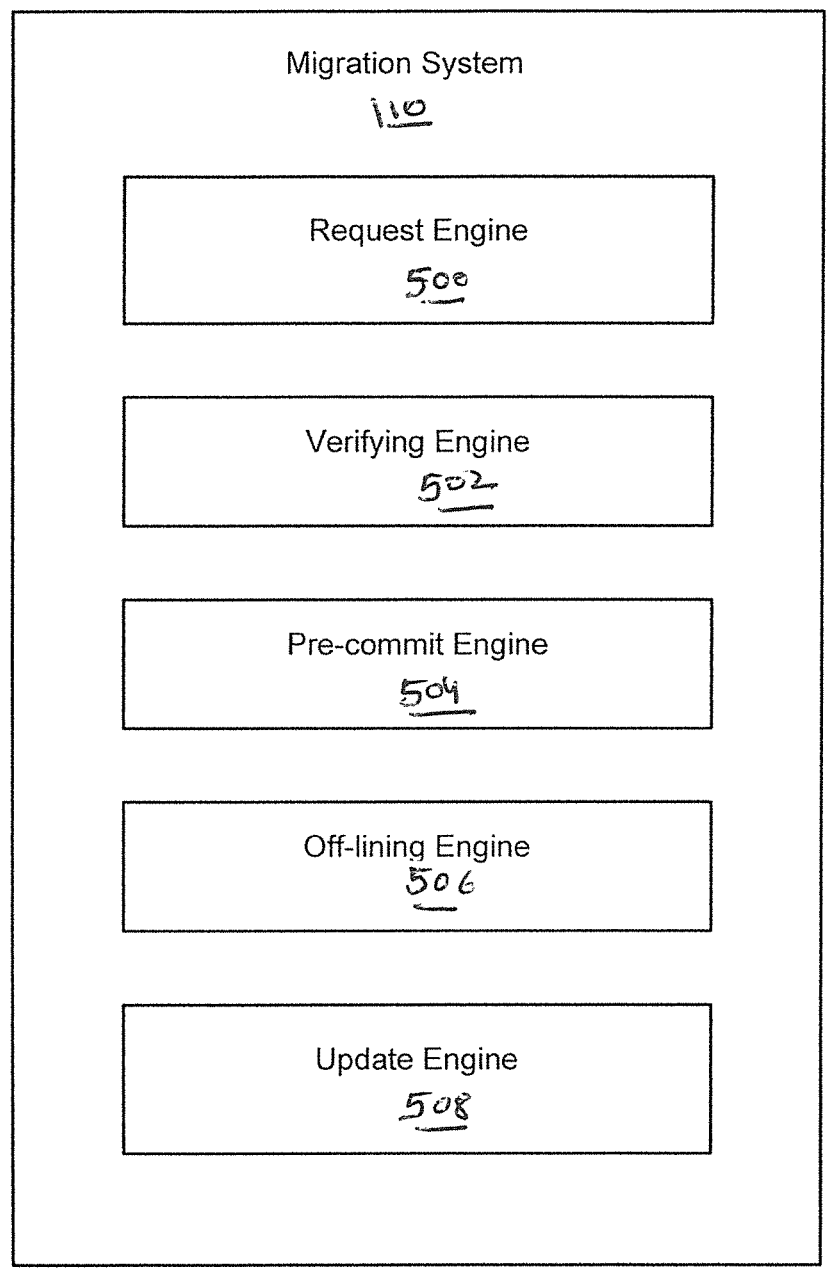
FIG. 5A shows an example of a migration system used according to one aspect of the present disclosure.

Migration System:

Shown in FIG. 5A is an example of the migration system 110 implementing techniques of the present disclosure. Preferably, the migration system 110 may be embodied as one or more software-executing processors operative in the clustered nodes and cluster manager 124 for implementing the functional components of the migration system. In other aspects, the migration system may be implemented as firmware, hardware, or a combination of firmware, hardware, and software-executing processors in accordance with various aspects of the disclosure. Accordingly, it will be appreciated that the disclosure is not limited to the aspects described herein.

Illustratively, components of the migration system 110 include a request engine 500, a verifying engine 502, a pre-commit engine 504, an offlining engine 506, and an update engine 508. Request engine 500 may receive a request to migrate an aggregate to a destination storage system node when an administrator (e.g., administrator 402) interfaces with the cluster manager 124 to initiate the migration operation. Alternatively, the request may be automatically generated by request engine 500 when the cluster manager monitors an event at a node, for instance. Upon the cluster manager monitoring the event, request engine 500 may retrieve from memory an aggregate ID and a destination D-module ID, for example, supplied by the administrator at an earlier point in time. Whether receiving or generating a migration request, request engine 500 determines the node which presently owns the aggregate (source storage system node) and forwards the migration request to the source storage system node.

In one aspect, determination of the source storage system node may be performed by accessing the VLDB of the cluster manager (e.g., VLDB 404), retrieving the D-modules ID (or node ID) associated with the aggregate ID in the VLDB, and forwarding the migration request to the node associated with the retrieved node ID.

Verifying engine 502 performs operations for verifying a configuration of the destination storage system node. Verifying the configuration may involve the source storage system node requesting (e.g., via cluster switching fabric 118) confirmation from the destination storage system node that the destination storage system node is configured to service the aggregate and the destination storage system node determining whether the destination storage system node is configured to service the aggregate.

In one aspect, the destination storage system node is configured to service the aggregate when the destination storage system node operates in accordance with a predetermined configuration. The predetermined configuration may involve one or more operating characteristics of the destination storage system node required to service the aggregate. The predetermined configuration may be implemented as a data structure such as a configuration table (config table) stored in memory of the destination storage system node (e.g., memory 204 from FIG. 2), where each entry in the config table constitutes an operating characteristic for the predetermined configuration.

FIG. 5B illustrates an exemplary config table (or data structure) 510 for storing the predetermined configuration of the destination storage system node which may be supplied by the administrator to the destination storage system node during initialization, for example, or provided as part of the manufacturing process of the node.

One exemplary operating characteristic of config table 510 may involve the presence of a cluster quorum at a node as indicated by field cluster_quorum 512. Presence of a cluster quorum at a node means that the node is operative to service storage requests.

To determine whether the cluster quorum is present at the destination, verifying engine 502 may query the storage operating system 206 of the destination storage system node to determine the operating mode of the destination storage system node. For instance, the destination storage system node operates in a "normal" mode when ordinary operations of a storage server, including servicing storage requests, are being carried out at the destination storage system node. At certain times, however, the destination storage system node may operate in "degraded mode" involving limited storage server functionality when a storage component fails or during routine upgrade and maintenance, for example. The modes may be set automatically by the storage operating system 206 detecting a failure or receiving a request by the administrator to perform upgrade operations, for instance.

When a failure is restored, the storage operating system 206 of the node may automatically change the mode back to "normal," or alternatively, changes to the mode may be performed manually by the administrator. Upon querying the storage operating system 206 and determining the destination storage system node is operative in the normal mode, a cluster quorum is considered present at the destination.

Other exemplary operating characteristics may include existence of a particular software version number (indicated by a field version_#514) and a current configuration which is not at maximum storage limits (indicated max_limit 516). The software version number may be verified by querying the storage operating system 206 for a version and comparing the version provided by the querying to the version indicated in version_#514. Verifying engine 502 may also determine a storage limit status by querying the storage operating system 206 for information related to the file system layer (e.g., file system 302), for instance.

Illustratively, the file system layer 302 operative at the destination storage system node may only manage a certain number of aggregates, so if managing an additional aggregate would exceed the capabilities of the file system then the destination storage system node would not be configured to service a migrated aggregate. To that end, verifying engine 502 may query the storage operating system 206 for the maximum number of aggregates permitted by the file system layer and the current number of aggregates managed by the file system layer.

If maximum number and the current number match, then verifying engine 502 determines that storage limits would be exceeded as a result of the migration operation. In these cases, verifying engine 502 would result in a failure to confirm a configuration of the storage system node. It will be appreciated that although the exemplary aspect is discussed in relation to a file system and aggregates, other storage abstraction layers may be implemented by the storage operating system 206 for determining the maximum and current number of storage objects managed by the storage abstraction layer in accordance with the teachings of the present disclosure.

Yet another exemplary operating character may involve accessibility by the destination storage system node to all the storage devices of the aggregate as indicated by aggregate access 518 in config table 510. In one aspect, verifying engine 502 may determine the set of physical storage devices which constitute the aggregate by querying the source storage system node for such information. Using the list of storage devices provided by the source storage system node resulting from the querying, the destination storage system node may then attempt to access each disk indicated by the source storage system node. If the attempted access is successful (e.g., attempted storage device access by the destination storage system node does not result in any "read" or other errors), then verifying engine 502 confirms that the destination storage system node is capable of accessing storage devices of the aggregate.

It will be appreciated that the novel migration system may implement all or none of the operating characteristics above constituting the predetermined configuration of the destination; but rather, or in addition to, other operating characteristics different from those described above may be included in the predetermined configuration when determining whether the destination storage system node is configured to service the aggregate as indicated by field 520. When the operating characteristics of config table 510 have been confirmed by verifying engine 502, the destination storage system node operates in accordance with the predetermined configuration and is thus configured to service the aggregate.

In certain aspects, verifying engine 502 may further be operative to determine whether the source storage system node is configured to facilitate the migration operation. The source storage system node may be considered to be configured to facilitate the migration operation a proper operating condition exists at the source storage system node to permit migration.

In one example, when other operations are not actively being performed on the aggregate which would otherwise be disrupted during a migration operation, then the proper operating conditions exists at the source storage system node to permit migration. In this way, the migration system 110 may ensure that carrying out a migration operation on the aggregate will not interrupt other potentially critical operations being performed on the aggregate. Exemplary active operations precluding a migration operation may thus include operations in support of fault tolerance, maintenance, and servicing of access requests, for instance. In the event active operations are being performed on the aggregate, then proper operating conditions at the source storage system node do not exist thereby precluding a migration operation.

To that end, a veto check on the source storage system node may be invoked by verifying engine 502 to query one or more modules within the storage operation system 206 of the source storage system node to determine whether certain operations are being performed on the aggregate.

Verifying engine 502 may access a list of modules stored in a data structure (e.g., stored in memory 204) which indicates the particular modules to be queried. In one example, a RAID module (part of storage driver 310) may be queried to determine whether operations such as mirroring data across storage devices, adding storage devices to the aggregate, recovering from a storage device failure on which the aggregate resides, or other fault-tolerant operations are being performed on the aggregate to preclude migration. The file system module (e.g., file system module 302) may be queried to determine whether maintenance operations or servicing of an access request is actively being performed on the aggregate. Other modules of the storage operating system 206 may also be queried in accordance with certain aspects of the present disclosure to determine whether other respective operations are actively being performed on the aggregate to preclude the migration operation.

Preferably, if the modules return a response to the storage operating system 206 indicating that no active operations are being performed on the aggregate, then proper operating conditions are considered to exist at the source storage system node permitting a migration operation. A result of the veto check then includes a negative response indicating operating conditions at the source storage system node permit the migration operation, whereas a positive response indicates active operations currently being carried out at the source storage system node thus precluding a migration operation.

In other aspects, proper operating conditions at the source storage system node may be determined based on a state of the aggregate. The aggregate state may be implemented as an indictor associated with the aggregate (e.g., stored in memory 204) for indicating whether the aggregate may be migrated. It may be desirable for an aggregate to remain owned by the source storage system node due to optimal system performance, source configuration, or other operating conditions for which it may be preferable for the source storage system node to continue servicing the aggregate, for instance.

Illustratively, the aggregate state may be supplied by the administrator interfacing with the source storage system node at a user console of the source storage system node (e.g., using command line or graphical user interfaces), or may automatically be set by the storage operating system 206 of the source storage system node managing the aggregate. For instance, the storage operating system 206 may automatically set the aggregate state based on a particular characteristic of the source storage system node or the aggregate itself which may be supplied by the administrator upon initializing the source storage system node or programmed by a manufacturer of the source storage system node.

Illustratively, the aggregate may be associated with a first indicator (e.g., "no") indicating that migration is not permitted or a second indicator (e.g., "yes") indicating that migration is permitted. It will be appreciated that different aggregate states and/or indicators may be implemented in accordance with other aspects so the present disclosure is not limited to the exemplary descriptions provided herein. To determine proper operating conditions at the source storage system node based on an aggregate state, a veto check may be performed by verifying engine 502 involving accessing the location of the indicator for the aggregate state to determine whether the aggregate state permits migration. When the aggregate state permits migration, the source storage system node is thus considered to have a proper operating condition for permitting migration.

Referring back to FIG. 5A, pre-commit engine 504, operative in the migration system 110 perform a "pre-commit" operation before bringing an aggregate "offline". Pre-commit engine 504 performs various steps to prepare the aggregate and the associated volumes for going offline.

Offlining engine 506 also operative in the migration system 110 offlines the aggregate to ensure that data of the aggregate does not change during the migration. In one aspect, offlining involves denying storage requests from clients so data of the aggregate does not change during a migration process. To that end, upon a client request to access the aggregate at a storage device, offlining engine 506 may respond to the request with an error or failure message. In other aspects, client requests may be cached in memory (e.g., memory 204) at the source storage system node until the destination storage system node takes ownership of the aggregate. For example, responsive to an update to the local RDB indicating the destination storage system node as the new owner of the aggregate, offlining engine 506 may forward the cached client requests to the destination storage system node for servicing by the destination.

Illustratively, update engine 508 performs operations in support of on-lining the aggregate at the destination storage system node to resume servicing of the aggregate at the destination. The update engine performs "post-migration" operations, for example, the file system 360 may clean-up certain data structures that may be associated with the aggregate at the source storage system node.

Figure 6:
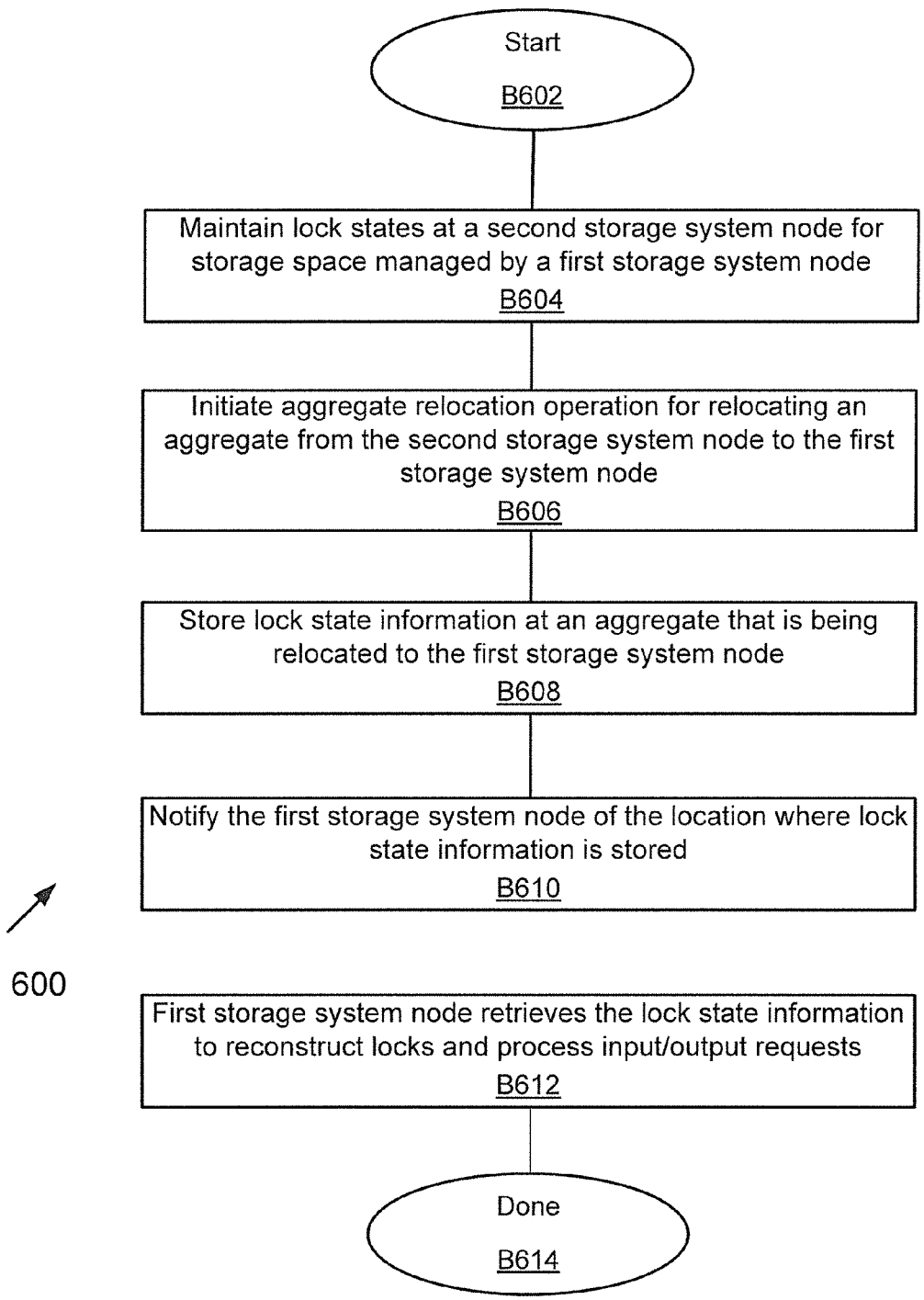
FIG. 6 shows a process for handling lock state information, according to one aspect of the present disclosure.

Process Flow:

FIG. 6 shows a process 600 for avoiding transfer of lock state information via a network link (for example, 311, FIG. 3B), as part of an ARL operation. The process may be conducted as part of ARL takeover or give back. As an example, assume that aggregate 307B shown in FIG. 3B is being given back to node 102A by node 102B.

The process starts in block B602, when the migration system 110 is initialized and operational. Both the source and destination storage system nodes operate as partner nodes. In block B604, the source storage system node (node 102B) maintains the lock states for the aggregate (or volumes) that are managed by the destination storage system node (node 102A). The ARL operation is initiated in block B606 based on a request from the cluster manager 124 or otherwise.

In block B608, the source storage system node 102B stores the lock state information at the aggregate for the destination storage system node 102A. In one aspect, the lock states for aggregate 307A are stored at a storage device (112) from a memory location (for example, 204, FIG. 2). The location for the lock state information is then provided to the destination storage system node in block B610. As part of ARL, in block B612, the destination storage system node 102A retrieves the lock state information from the storage device to a memory device (204). The destination storage system node 102A can then reconstruct the locks for aggregate 307A and service client requests. The process then ends in block B614.

In one aspect, lock state information is not transferred via link 311 and instead is stored at a storage device of aggregate 307A. The destination storage system node 102B simply retrieves the lock state information from the storage device and moves it to the memory. This saves time and computing resources.

Figure 7:
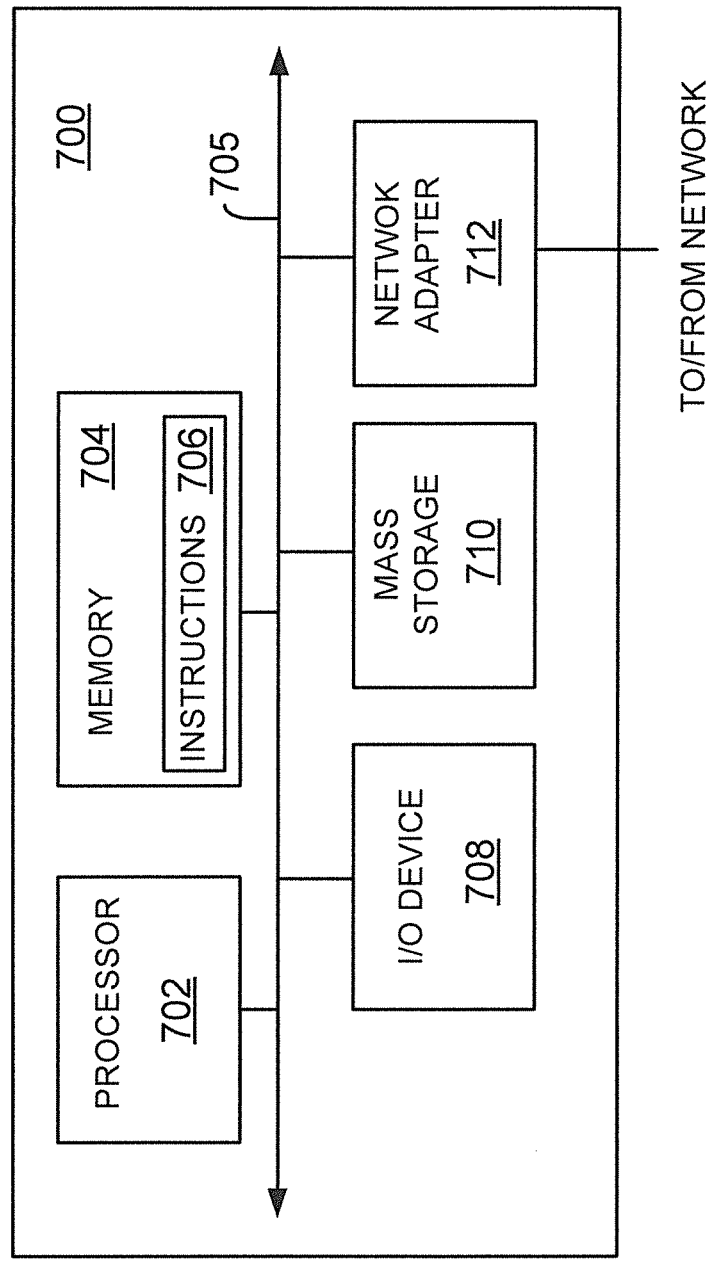
FIG. 7 shows a block diagram of a system, using the methodology of the present disclosure.

Processing System:

FIG. 7 is a high-level block diagram showing an example of the architecture of a processing system, at a high level, in which executable instructions as described above can be implemented. The processing system 700 can represent clients 122, cluster manager 124 and others. Note that certain standard and well-known components which are not germane to the present disclosure are not shown in FIG. 7.

The processing system 700 includes one or more processors 702 and memory 704, coupled to a bus system 705. The bus system 705 shown in FIG. 7 is an abstraction that represents any one or more separate physical buses and/or point-to-point connections, connected by appropriate bridges, adapters and/or controllers. The bus system 705, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 702 are the central processing units (CPUs) of the processing system 700 and, thus, control its overall operation. In certain aspects, the processors 702 accomplish this by executing programmable instructions stored in memory 704. A processor 702 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 704 represents any form of random access memory (RAM), read-only memory (ROM), flash memory, or the like, or a combination of such devices. Memory 704 includes the main memory of the processing system 700. Instructions 706 which implements techniques introduced above (for example, with respect to FIG. 6) may reside in and may be executed (by processors 702) from memory 704.

Also connected to the processors 702 through the bus system 705 are one or more internal mass storage devices 710, and a network adapter 712. Internal mass storage devices 710 may be or may include any conventional medium for storing large volumes of data in a non-volatile manner, such as one or more magnetic or optical based disks. The network adapter 712 provides the processing system 700 with the ability to communicate with remote devices (e.g., storage servers) over a network and may be, for example, an Ethernet adapter, a FC adapter, or the like. The processing system 700 also includes one or more input/output (I/O) devices 708 coupled to the bus system 705. The I/O devices 708 may include, for example, a display device, a keyboard, a mouse, etc.

Cloud Computing:

The system and techniques described above are applicable and useful in the upcoming cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud.

After the application layer, is a cloud platform and cloud infrastructure, followed by a "server" layer that includes hardware and computer software designed for cloud specific services. Details regarding these layers are not germane to the inventive aspects.

Thus, a method and apparatus for managing locks have been described. Note that references throughout this specification to "one aspect" or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A machine implemented method, comprising:
   storing lock state information, by a second storage system node, at a storage device previously managed by a first storage system node, the lock state information included in an aggregate organized in the storage device, wherein the first storage system node and the second storage system node operate as partner nodes;
   during one of a relocation and a migration of the aggregate from the second storage system node to the first storage system node:

notifying the first storage system node of a storage device location where the lock state information included in the aggregate is stored; and copying the lock state information from the storage device location to a memory device location managed by the first storage system node; and using the lock state information by the first storage system node to reconstruct any locks for storage space presented to a client and processing client requests for reading and writing information at the storage device.

2. The method of claim 1 wherein the second storage system node takes over management of the aggregate when the first storage system node is taken off line.

3. The method of claim 2, further comprising: transferring ownership of the aggregate by the second storage system node to the first storage system node, when the first storage system node is on-line.

4. The method of claim 1, wherein the first storage system node and the second storage system node operate in a cluster.

5. The method of claim 1, wherein the lock state information is maintained as part of a lock state data structure by the second storage system node.

6. The method of claim 1, wherein the second storage system node copies the lock state information from a memory device managed by the second storage system node to the storage device.

7. A machine readable storage medium storing executable instructions, which when executed by a machine, causes the machine to perform a method, the method comprising:

storing lock state information by a second storage system node at a storage device previously managed by a first storage system node, the lock state information included in an aggregate organized in the storage device, wherein the first storage system node and the second storage system node operate as partner nodes;

during one of a relocation and a migration of the aggregate from the second storage system node to the first storage system node:

notifying the first storage system node of a storage device location where the lock state information included in the aggregate is stored; and copying the lock state information from the storage device location to a memory device location managed by the first storage system node; and using the lock state information by the first storage system node to reconstruct any locks for storage space presented to a client and processing client requests for reading and writing information at the storage device.

8. The storage medium of claim 7 wherein the second storage system node takes over management of the aggregate when the first storage system node is taken off-line.

9. The storage medium of claim 8, wherein the second storage system node transfers ownership of the aggregate to the first storage system node, when the first storage system node is on-line.

10. The storage medium of claim 7, wherein the first storage system node and the second storage system node operate in a cluster.

11. The storage medium of claim 7, wherein the lock state information is maintained as part of a lock state data structure by the second storage system node.

12. The storage medium of claim 7, wherein the second storage system node copies the lock state information from a memory device managed by the second storage system node to the storage device.

13. A system, comprising:

a first storage system node and a second storage system node coupled via a network link, operating as partner nodes; wherein a processor for the second storage system node executing instructions out of a memory:

stores lock state information at a storage device previously managed by the first storage system node, the lock state information included in an aggregate organized in the storage device;

during one of a relocation and a migration of the aggregate from the second storage system node to the first storage system node:

notifies the first storage system node of a storage device location where the lock state information included in the aggregate is stored; and copies the lock state information from the storage device location to a memory location managed by the first storage system node; and the first storage system node uses the lock state information to reconstruct any locks for storage space presented to a client and then processes client requests for reading and writing information at the storage device.

14. The system of claim 13 wherein the second storage system node takes over management of the aggregate when the first storage system node is taken off-line.

15. The system of claim 14, wherein the second storage system node transfers ownership of the aggregate to the first storage system node, when the first storage system node is on-line.

16. The system of claim 13, wherein the first storage system node and the second storage system node operate in a cluster.

17. The system of claim 13, wherein the lock state information is maintained as part of a lock state data structure by the second storage system node.

* * * * *